Feb. 2, 1965  H. STRAUB  3,168,176
ELECTROMAGNETICALLY OPERATED MULTI-DISC CLUTCH
Filed Jan. 4, 1962
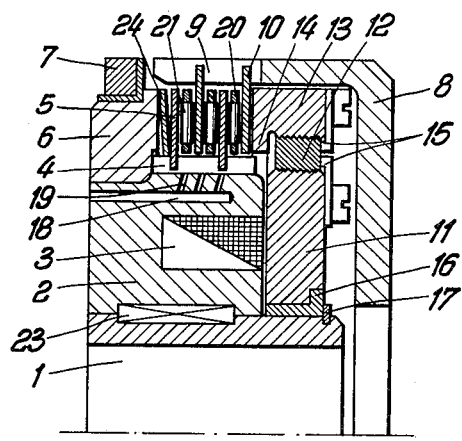
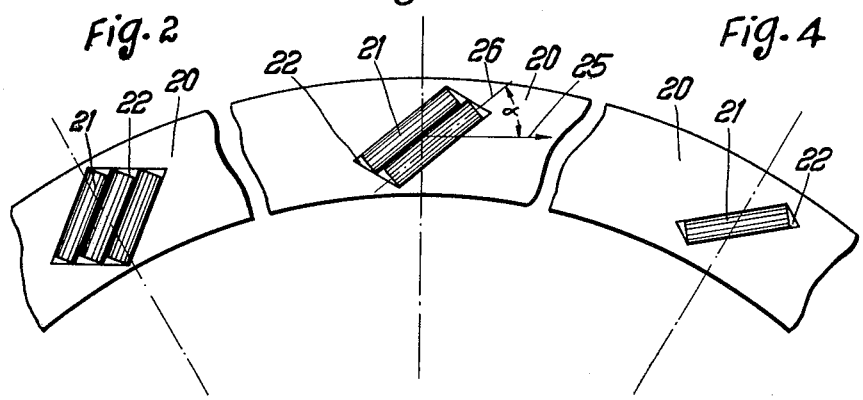
Inventor:
Hermann Straub
by: Alberton Zilkind

UNITED STATES PATENT OFFICE 3,168,176
Patented Feb. 2, 1965

3,168,176
ELECTROMAGNETICALLY OPERATED MULTI-DISC CLUTCH
Hermann Straub, Friedrichshafen, Germany, assignor to Zahnradfabrik Friedrichshafen, Aktiengesellschaft, Friedrichshafen, Germany
Filed Jan. 4, 1962, Ser. No. 167,463
Claims priority, application Germany, Feb. 21, 1961, Z 8,567
5 Claims. (Cl. 192—84)

This invention relates to electromagnetic clutches of the multi-disc type and more particularly to improvements in disc arrangements.

Multi-disc electromagnetic clutches have long been known and they comprise, essentially, a drive shaft on which a series of frictional discs are slidably keyed and another shaft to be driven by the first shaft to which another set of discs are slidably keyed which are interleaved with the first set of discs. By means of an electromagnet and an armature the sets of discs may be squeezed together for effecting a drive between the two shafts. Conventional clutches constructed along the general lines described are subject to various drawbacks such as delay in engagement and delay in disengagement. Also there is difficulty in proper cooling under high speed and/or heavy load conditions. In fact, under some circumstances conventional clutches are subject to considerable thermal stress.

It is an object of the present invention to overcome the above drawbacks by providing a clutch of simple and rugged construction capable of very quick engagement and disengagement and inherently capable of rapid heat dissipation. This is of particular importance in the use of electromagnetic clutches for machine tools.

Briefly, the clutch of the present invention comprises in addition to a solenoid magnet body and armature, a unique arrangement of frictional discs between which are ringlike carriers or cages which have angularly spaced slots and in which slots one or more rollers are placed. Such rollers are set at an angle of less than 90 degrees to the tangential direction of rotation of the clutch. The rollers act as drive transmitting bodies between the interleaved sets of frictional discs. With such an arrangement it is possible to have all of the drive elements, that is the frictional discs and the rollers, exceedingly close to each other or in fact contiguous. Accordingly, the amount of axial movement of such components to effect disengagement is being that merely necessary to effect contact pressure between the several components described. Similarly axial movement of such components to effect disengagement is of the same small magnitude. Further, due to the rollers having rolling and sliding components of motion by virtue of their angular disposition, considerably less heat is generated by friction when the clutch is thrown into engagement and very little idling friction is encountered. The frictional clutch discs themselves do not engage with each other at any time. A cooling agent, for example, air or oil, can readily circulate throughout the region of the engaging elements by virtue of the spacing effected therebetween, since the rollers are of somewhat greater thickness than the carrier rings and thereby effect space for coolant circulation. In fact, the moving of the rollers at an angle to the rotational path effects a pumping action to keep coolant in circulation.

Thus the clutch as disclosed herein is extremely durable and highly efficient from the standpoint of rapid action, as well as very low idling friction. The construction is such as to take advantage of automatic armature spacing to compensate for wear in accordance with the teaching in my prior patent application, Serial No. 82,651, filed January 13, 1961.

A detailed description of the invention will now be given in conjunction with the appended drawing, in which:

FIG. 1 is a longitudinal cross section of a clutch assembly; and

FIGS. 2, 3, and 4 show different forms of roller arrangements as carried by the cage rings.

Referring now to the drawing, a drive shaft 1 carries a magnet body 2, keyed thereto, which magnet body has the usual solenoid 3. The magnet body has a ring 6 fixed thereto which carries a collector ring 7 for conducting current to the solenoid in a well understood manner. The magnet body is also provided with passages for coolant 18 and 19. Rotatively and slidably carried on shaft 1 is a ferromagnetic armature 11 supported on a bronze bushing 16 secured on the shaft by a ring 17. The periphery of the armature carries a nonmagnetic ring 12 of bronze, or the like, which carries a magnetically permeable ferromagnetic ring 13 for effecting pressure via integral flange 14, on the frictional elements to be described.

Ring 12 is threadedly secured to armature 11 and to ring 13 and has pawl teeth (not shown) which will be understood to coact with locking pawls 15 in a manner which effects automatic axial adjustment of ring 13, as disclosed in the aforementioned patent application.

A clutch ring 8 which will be understood to be part of the driven side of the clutch is provided with fingers 9 passing through slots of outer discs 10, in the usual manner, whereby discs 10 have some longitudinal play with respect to the fingers and are keyed thereto. Similarly, a set of inner discs 5 are keyed to splines 4 integral with magnet body 2.

Intermediate complementary pairs of discs 5 and 10 are cages which are effected by rings 20 provided with slots 22 in which are carried one or more rollers 21, as will be clearly seen in FIGS. 2, 3, and 4. The axis 26 of the rollers is at a particular angle α with respect to the tangential direction of movement of the rings 20. Thus the rings serve as cages or carrier rings for the rollers 21 and will be understood to be supported on the splines 4 for centering with respect to the clutch axis. The assembly of discs and rings is maintained in contiguous condition by a disc washer 24 intermediate the last disc 5 and the body ring 6. In operation, when the solenoid 3 is energized, the armature 11 puts pressure on the composite assembly of discs and rollers. Upon such pressure being applied, the inside discs 5 driven by the drive shaft 1 will cause the rollers 21 to move with a rotational motion about their own axes and also with a dragging effect on the contiguous discs 10, due to the oblique positioning of the roller axes. The result is that torque is transmitted to the discs 10 for driving the clutch ring 8. The degree of friction of the rollers against the discs 10 is dependent on the angle α. In other words, where the angle is at 90 degrees, the rollers will have only a rolling effect and little or no drive effect. Where the rollers are parallel to the tangent of motion there will be virtually no rolling effect, but considerable frictional or drive effect.

The rollers may be used singly or in groups, carried in slots distributed around the rings 20. In the illustration of FIGS. 2, 3, and 4 the rollers are set at substantially 45 degrees which is believed to be the best compromise from a standpoint of achieving all necessary driving effect, while at the same time maintaining idling friction at a minimum despite contiguity of all of the elements of the assembly during idling.

A particularly advantageous effect of the pawl arrangement 15 and the threaded ring 12 is found in the fact that the degree of frictional engagement can be varied so that the clutch can be used to advantage as a slip clutch.

Various materials may be utilized for the clutch elements. For example, the discs 5 and 10 may be steel or sintered bronze, asbestos, or the like, dependent on whether the clutch is to be run wet or dry. In any event the coolant passages 18 and 19 can be used for providing any suitable coolant. It has been found in a clutch made in accordance with the invention that air cooling is sufficient, although it is recognized that for extremely heavy applications, oil could be used.

The rollers 21 are preferably made of steel in order to be highly resistant to wear.

Having thus described the invention, I am aware that various changes may be made without departing from the spirit thereof, and therefore, do not desire to be restricted to the precise illustration herein given, except as set forth in the appended claims.

What is claimed is:

1. An electromagnetic clutch comprising a magnet body having a solenoid and comprising an armature, a plurality of friction discs arranged to have pressure exerted thereon by said armature when said solenoid is energized, and an annular array of rollers intermediate said friction discs, wherein said friction discs do not directly engage each other, but transmit torque through said rollers and support means for supporting said rollers with their axes at an angle of less than 90 degrees to the tangential direction of motion of said discs, said solenoid, armature, discs, and the roller array being concentric.

2. In a device as set forth in claim 1, said support means comprising a plurality of rings having slots therethrough, said rollers being in said slots, said rollers having a diameter greater than the thickness of said rings.

3. In a device as set forth in claim 2, including means for effecting passage of coolant into said assembly comprising passages through said magnet body, said friction discs and rings being arranged around said body.

4. In a device as set forth in claim 2, said rollers being comprised of steel, and said friction discs being comprised of sintered bronze.

5. In a device as set forth in claim 2, including means for adjusting the final spacing of said armature and said solenoid body.

References Cited in the file of this patent

UNITED STATES PATENTS

| | | |
|---|---|---|
| 2,718,292 | Meilander | Sept. 20, 1955 |
| 2,893,528 | Ryba | July 7, 1959 |
| 2,957,562 | Rudisch | Oct. 25, 1960 |
| 2,966,975 | Weidmann et al. | Jan. 3, 1961 |
| 3,017,006 | Dence et al. | Jan. 16, 1962 |
| 3,034,365 | Stieber | May 15, 1962 |